US006200647B1

(12) United States Patent
Emslander et al.

(10) Patent No.: US 6,200,647 B1
(45) Date of Patent: *Mar. 13, 2001

(54) IMAGE RECEPTOR MEDIUM

(75) Inventors: Jeffrey O. Emslander, Afton; Christopher A. Haak, Oakdale, both of MN (US)

(73) Assignee: 3M Innovative Properties Company, St. Paul, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/109,471

(22) Filed: Jul. 2, 1998

(51) Int. Cl.[7] .................... C08J 7/04

(52) U.S. Cl. .................... 427/511; 427/256; 427/407.1; 427/558; 427/559; 428/195; 428/212; 428/323; 428/325; 428/327; 428/483; 428/516; 430/126

(58) Field of Search .................... 428/195, 212, 428/323, 325, 327, 483, 516; 430/126; 427/511, 558, 559, 256, 407.1

(56) References Cited

U.S. PATENT DOCUMENTS

| | | |
|---|---|---|
| 4,737,224 | 4/1988 | Fitzer et al. . |
| 4,837,088 | 6/1989 | Freedman . |
| 4,925,174 | 5/1990 | Bruce et al. . |
| 4,946,532 | 8/1990 | Freeman . |
| 5,114,520 | 5/1992 | Wang, Jr. et al. . |
| 5,262,259 | 11/1993 | Chou et al. . |
| 5,372,669 | 12/1994 | Freedman . |
| 5,389,723 | 2/1995 | Iqbal et al. . |
| 5,462,768 | 10/1995 | Adkins . |
| 5,472,789 | 12/1995 | Iqbal et al. . |
| 5,562,951 * | 10/1996 | Kamen . |
| 5,721,086 | 2/1998 | Emslander et al. . |
| 5,747,148 | 5/1998 | Warner et al. . |

FOREIGN PATENT DOCUMENTS

| | | | |
|---|---|---|---|
| 0 466 503 | 1/1992 | (EP) | G03G/7/00 |
| 0 683 057 | 11/1995 | (EP) | B41M/5/00 |
| 0 730 061 | 9/1996 | (EP) | D21H/19/20 |
| 0 767 070 | 4/1997 | (EP) | B41M/5/00 |
| WO 98/04960 | 2/1998 | (WO) | G03G/7/00 |

* cited by examiner

*Primary Examiner*—Bernard Pianalto
(74) *Attorney, Agent, or Firm*—Dale A. Bjorkman

(57) ABSTRACT

An image receptor medium including an image reception layer having two major opposing surfaces. The image reception layer comprises a polymer comprising at least two monoethylenically unsaturated monomeric units, wherein one monomeric unit comprises a substituted alkene where each branch comprises from 0 to about 8 carbon atoms and wherein one other monomeric unit comprises a (meth) acrylic acid ester of a nontertiary alkyl alcohol in which the alkyl group contains from 1 to about 12 carbon atoms and can include heteroatoms in the alkyl chain and in which the alcohol can be linear, branched, or cyclic in nature and an efficacious amount of a free-radical scavenger. Alternatively, the image receptor medium includes a substrate layer comprising a polymer substrate layer having two major opposing surfaces and an image reception layer on a first major surface of the substrate layer. The image reception layer has an outer surface for receiving images, and comprises a polymer identified above. Either embodiment of the image receptor medium may further include an optional prime layer, an optional adhesive layer, and an optional inkjet layer.

5 Claims, 1 Drawing Sheet

IMAGE RECEPTOR MEDIUM

FIELD OF THE INVENTION

This invention relates to films useful as image receptor media for a variety of imaging materials such as inks and toners.

BACKGROUND OF THE INVENTION

Advertising and promotional displays often include graphic images appearing on structural surfaces such as truck sides and awnings, or free-hanging as banners. To prepare the display, an image may be formed on an adhesive-backed image receptor medium, sometimes referred to as a graphic marking film, which is then adhered to the desired substrate. Alternatively, the image may be formed first on a temporary carrier, or image transfer medium, and transferred to the image receptor medium. The image receptor medium usually includes a base material with an additional receptor layer overlying it. The base material is typically a plasticized vinyl film, although paper may also be used.

Although the graphic display may be intended for a long term installation of 5 years or more, it is often a relatively short term (3 months to 1 year) outdoor installation. In the case of a short term display, the image receptor medium is desirably a low cost, weather resistant, durable graphic marking film having good printability and adhesion of inks and/or toners that is easily applied to and removed from a surface. The vinyl base films currently used in graphic marking films are generally too costly for a short term application, and present problems with plasticizer migration, plasticizer staining and adhesive anchorage. In addition, the chemical nature of the vinyl may present problems. For instance, the chlorinated composition of vinyl may lead to environmental difficulties related to vinyl disposal and use in applications having a risk of fire, due to hazardous decomposition products, and the cadmium found in stabilizers used in most vinyl formulations is restricted or prohibited in many countries. Paper-based media are not sufficiently durable or weather resistant and tear easily when removed. Polyolefin base films are low cost and contain no plasticizer but do not provide good ink/toner adhesion. The application of the receptor layer over the base film usually requires an additional process step, thus adding cost to the manufacturing process.

Images can be created by one of several known methods, such as electrography, screen printing, ink jet printing, and thermal mass transfer. Electrography involves passing a substrate, normally a dielectric material, through an electrographic printing device, one type of which is an electrostatic printer. In the printer, the substrate is addressed with static electric charges (e.g., as from a stylus) to form a latent image which is then developed with suitable toners. This technique is especially suitable for producing large scale images for use on posters and signs.

At the conclusion of the electrographic process where the toned image has been developed on the dielectric substrate, the printed substrate can be enclosed between two layers of clear vinyl plastic film and used directly in an outdoor application, such as a sign. Because the typical dielectric substrates are paper-based, however, they frequently lack the weather resistance required for outdoor signs. More durable substrates such as polyvinylchloride (PVC) and polyvinylacetate (PVA) films are difficult to image directly because of their electrical and mechanical properties.

To produce large signs that are suitable for outdoor display, the toned image electrographically deposited on a dielectric substrate can be transferred to a more weather resistant image receptor medium. The dielectric substrate is then known as an image transfer medium. This technique is discussed in U.S. Pat. No. 5,262,259. Image transfer may also be practiced with images created by a variety of other known techniques such as knife coating, roll coating, rotogravure coating, screen printing, and the like.

Transfer of the image from an image transfer medium to an image receptor medium typically requires the application of pressure and heat through, for example, lamination in a heated pressure roll system (hot roll lamination). This type of image transfer system is described in U.S. Pat. No. 5,114,520.

Images may also be created directly on a weatherable, durable image receptor medium using such techniques as screen printing and inkjet printing.

The inkjet printing process is now well known. Recently, wide format printers have become commercially available, making feasible the printing of large format articles such as posters, signs and banners. Inkjet printers are relatively inexpensive as compared with many other hardcopy output devices, such as electrostatic printers. Generally, thermal inkjet inks are wholly or partially water-based, whereas piezo inkjet inks can be solventless or solvent-based. Inkjet images may be printed on plain paper or on a suitable image receptor medium that has been treated or coated to improve its inkjet receptor properties. For example, it is known to apply an additional layer of material to an image receptor medium to improve the receptivity to and adhesion of inkjet inks. The materials commonly found in such an inkjet reception layer do not generally adhere well to many image receptor media base films, such as vinyl or polyester.

Print shops or graphic arts facilities that operate more than one type of printing process must stock a different image receptor medium for each process. Because of this, the inventory of receptor media can be large and expensive.

SUMMARY OF THE INVENTION

There is a need for a low-cost, durable, weather resistant image receptor medium that can be used with a variety of inks and toners and will accept a transferred image via hot roll lamination at rates faster than what is currently possible.

The present invention solves the problems in the art with a film for use as an image receptor medium with a variety of printing and image transfer processes, and a variety of imaging materials such as inks and toners. The image receptor medium accepts toned images from an electrographically-printed image transfer medium using hot roll lamination at faster transfer rates than current media and can be made of lower-cost materials.

In one aspect, the image receptor medium includes an image reception layer having two major opposing surfaces. The image reception layer comprises a polymer comprising at least two monoethylenically unsaturated monomeric units, wherein one monomeric unit comprises a substituted alkene where each branch comprises from 0 to about 8 carbon atoms and wherein one other monomeric unit comprises a (meth)acrylic acid ester of a nontertiary alkyl alcohol in which the alkyl group contains from 1 to about 12 carbon atoms and can include heteroatoms in the alkyl chain and in which the alcohol can be linear, branched, or cyclic in nature. Preferably, but optionally, the image reception layer includes an efficacious amount of a free-radical scavenger such as a hindered amine light stabilizer compound ("HALS" compound). The image reception layer provides properties of image receptivity to the image receptor medium. "Image receptivity" means that an image formed on or applied to the image receptor medium adheres completely or nearly completely after being subjected to a tape snap test in which 3M SCOTCH™ Tape No. 610 (commercially available from 3M Company, St. Paul, Minn., USA) is firmly applied to the image and then removed with a rapid jerking motion. A prime layer is optionally included on a first major surface of the image reception layer. In this case, the second major surface of the image reception layer is an outer surface for receiving images.

In another aspect, the image receptor medium includes a polymer substrate layer having two major surfaces and an image reception layer on one major surface of the substrate layer. The image reception layer has an outer surface for receiving images and comprises a polymer comprising at least two monoethylenically unsaturated monomeric units, wherein one monomeric unit comprises a substituted alkene where each branch comprises from 0 to about 8 carbon atoms and wherein one other monomeric unit comprises a (meth)acrylic acid ester of a nontertiary alkyl alcohol in which the alkyl group contains from 1 to about 12 carbon atoms and can include heteroatoms in the alkyl chain and in which the alcohol can be linear, branched, or cyclic in nature. The image reception layer preferably comprises at least 60% by weight of this polymer.

The image receptor medium can further include an optional prime layer on the major surface of the substrate layer opposite the image reception layer for promoting a strong bond between the substrate layer and an optional adhesive layer. The adhesive layer, preferably comprising a pressure sensitive adhesive, makes the multilayered film useful as a graphic marking film. The prime layer may also by itself serve as an adhesive layer. The image receptor medium can also further include an optional inkjet layer overlying the outer surface of the image reception layer for promoting the printability and receptivity of inkjet inks on the image receptor medium. The inkjet layer preferably comprises at least one top coat layer of one composition and at least one bottom coat layer of a second composition. The bottom coat layer contains dispersed particles of a size that causes protrusions from the surface of the top coat layer.

In the case where the image receptor medium includes a substrate layer, the image receptor medium can advantageously combine the best properties of several resins in the various layers while minimizing the use of the most expensive resins, leading to a higher value and lower cost image receptor medium. For example, the substrate layer is made with resins of generally low cost that can be chosen to provide specifically desired physical properties to the multilayered film. These properties may include dimensional stability, tear resistance, ability to withstand ultra-violet light (UV) used for curing inks that are used for forming images, conformability, elastomeric properties, die cuttability, stiffness and heat resistance.

The image receptor medium can be made of only nonhalogenated polymers, meaning that certain regulatory limitations are avoided in the disposal of waste materials (pertaining for example to polyvinyl chloride (PVC)). The image receptor medium exhibits image receptivity with a wide variety of printing materials such as screenprint inks, electrographic liquid and dry toners, thermal mass transfer materials, and inkjet inks (if the optional inkjet layer is present).

The image receptor medium need not contain plasticizers in any of its layers, thereby avoiding problems associated with plasticizer migration and plasticizer staining. The image receptor medium is especially useful as a graphic marking film or banner film for relatively short-term advertising and promotional displays, both indoors and outdoors.

In another aspect, the invention provides a method of making an image receptor medium that involves providing at least two charges, each charge comprising at least one film-forming resin; coextruding the charges to form a multilayered coextrudate, wherein each layer of said coextrudate corresponds to one of the charges; and biaxially stretching the coextrudate to form a multilayered film comprising a nonplasticized polymer substrate layer having two opposing major surfaces; and an image reception layer on a first major surface of the substrate layer. The image reception layer has an outer surface for image reception and comprises the polymer as described above.

In another aspect, the invention provides several methods of providing an image on an image receptor medium. In all of the methods, the image receptor medium includes a nonplasticized substrate layer and an image reception layer comprising the polymer as described previously. A first method involves forming an image on an image transfer medium via electrography and transferring the image on to the image receptor medium. Other methods involve screen printing the image on the image receptor medium, thermal inkjet printing the image on the image receptor medium (wherein the image receptor medium also includes an inkjet layer as described above), and forming the image by thermal mass transfer on the image receptor medium.

Embodiments of the invention are described in connection with the following drawings.

EMBODIMENTS OF THE INVENTION

Figure 1:
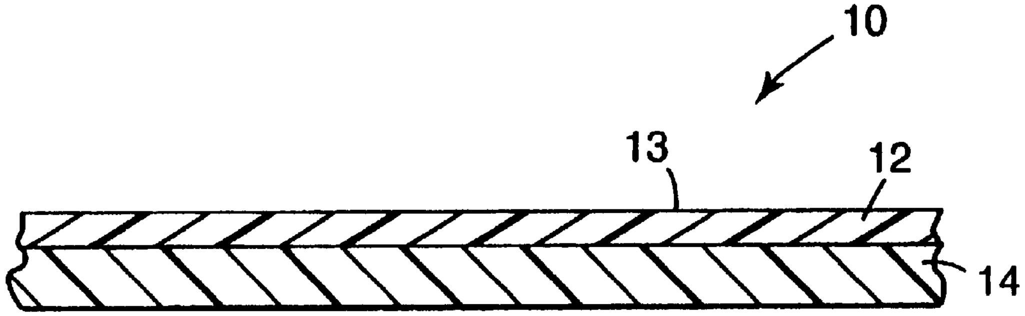
FIG. 1 is a schematic cross-sectional view illustrating an embodiment of the image receptor medium of this invention including an image reception layer and a substrate layer.

In one embodiment, the image receptor medium of this invention comprises a single image reception layer having two major surfaces. In another embodiment, as shown in FIG. 1, the image receptor medium 10 comprises a substrate layer 14 having two major surfaces and an image reception layer 12 overlying and in contact with one surface of the substrate layer as illustrated in FIG. 1. Image reception layer 12 has an outer surface 13 for receiving images.

Image Reception Layer

Image reception layer 12 comprises a polymer comprising at least two monoethylenically unsaturated monomeric units, wherein one monomeric unit comprises a substituted alkene where each branch comprises from 0 to about 8 carbon atoms and wherein one other monomeric unit comprises a (meth)acrylic acid ester of a nontertiary alkyl alcohol in which the alkyl group contains from 1 to about 12 carbon atoms and can include heteroatoms in the alkyl chain and in which the alcohol can be linear, branched, or cyclic in nature.

Nonlimiting examples of the first monomeric units include ethylene, propylene, butene, isobutylene, hexene, octene, and the like. Nonlimiting examples of the second monomeric units include methyl(meth)acrylate, ethyl(meth) acrylate, butyl(meth)acrylate, 2-ethylhexyl acrylate, ethoxyethyl acrylate, hexyl acrylate, and the like.

Of these polymers, ethylene methyl acrylates (EMAc) and ethylene ethyl acrylates (EEAc) are preferred because of their commercial availability. The polymer can be a random or block copolymer Preferably, the number of carbon atoms ranges from 2 to about 4 for the first monomeric unit and from 4 to about 8 for the second monomeric unit although the number of carbon atoms can be the same or different, and a mixture of different carbon length monomers can be used. Alternatively, a physical blend of polymeric resins may be used to produce a suitable image receptor layer.

The preferred commercially available acrylate polymers are typically used in the extrusion coating and laminating industries.

The quantity of polymers of the present invention in the image reception layer is preferably maximized within the limits of performance requirements of the image receptor medium. Routine efforts could be needed to optimize this quantity, although a typical formulation for most embodiments of the invention includes at least 60% and up to 100%, and preferably about 90% by weight of the polymers in the image receptor layer. The optimum quantity will depend upon the desired application and the targeted cost for the image receptor medium. The performance of the polymers of the present invention may be affected by other additives in the image reception layer.

The polymers of the present invention in the image reception layer provides image receptivity to a wide variety of imaging materials used in electrography, screen printing, thermal mass transfer or other printing processes. The polymers of the present invention are preferably capable of being extruded or coextruded into a substantially two-dimensional sheet and bonding without delamination to an adjacent substrate layer when the layers are coextruded or laminated. Alternatively, the polymers may be in the form of a dispersion capable of being coated onto a substrate layer by a method such as roll coating.

In the case where an image is transferred to the image receptor medium having both an image reception layer and a substrate layer from an image transfer medium by a method such as hot roll lamination, the image reception layer preferably remains fully attached to the substrate layer and shows minimal tendency to adhere to non-imaged portions of the image transfer medium.

The image reception layer may also contain other components such as pigments, fillers, ultraviolet (UV) stabilizing agents, antiblocking agents, antistatic agents, and carrier resins for additives such as pigments, all of which are familiar to those skilled in the art. These additives are preferably chosen so as not to interfere with image receptivity.

A preferred additive to the image reception layer is a free-radical scavenger present in an amount from about 0.05% to about 1.5% and preferably from about 0.2 to about 0.8 weight percent of the total composition of the image receptor layer. Nonlimiting examples of the scavenger include hindered amine light stabilizer (HALS) compounds, hydroxylamines, sterically hindered phenols, and the like. Preferably, the free-radical scavenger is regenerating such as existing with the HALS compounds.

While it is known to those skilled in the art that HALS compounds can be included in formulations to assist in minimizing the effects of UV light and to provide increased durability, the art has also recognized that such HALS compounds interfere with imaging because such HALS compounds migrate to the imaging surface of the film. Those skilled in the art view the use of HALS as a detriment to image quality, to be tolerated for the benefit of increased durability. The present invention has found that addition of free-radical scavenger unexpectedly provides both durability protection and excellent imaging.

Unexpectedly, the use of a free-radical scavenger combines with polymers of the present invention in the image reception layer to provide increased adhesion of screenprint inks. This increased adhesion is unexpected because, as stated above, stabilizer materials are commonly known to migrate to the surface of a film and interfere with the adhesion of surface coatings such as inks. Especially significant and unexpected is the increased adhesion of UV curing ink systems after the film has been exposed several times to intense UV ink curing radiation as commonly occurs with UV screenprinting. With many current graphic films, a problem occurs when multiple colors are printed with UV curing inks onto a graphic marking film. As each color is printed, the graphic is passed under a bank of high intensity UV lights to cure the most recently applied ink. After several passes it becomes difficult for the UV ink to bond to the film in the unimaged areas and poor ink adhesion results. There are several ways to increase ink adhesion after this occurs but all require extra processing steps and the associated increased costs all of which are undesirable. A film which maintains ink adhesion after multiple passes through a UV ink curing oven is desirable because it would lead to fewer processing steps and lower costs. In addition, some graphic fabricators would be allowed to increase the number of colors used in their graphics due to the lower cost of printing many colors without the additional processing steps required if the film is sensitive to multipass UV exposure.

If image reception layer 12 is used with a substrate layer 14, image reception layer 12 is relatively thin as compared to substrate layer 14, and preferably has a thickness in the range from 2.5 to 127 microns (0.1 to 5 mils). If image reception layer 12 is not associated with a substrate layer 14, then image reception layer 12 may need to be thicker than the above-described range to provide sufficient durability and dimensional stability for the intended application. A thicker image reception layer can increase the overall cost of the image receptor medium.

Optional Substrate Layer

In one embodiment, a substrate layer 14 is included in the image receptor medium for example to reduce the cost and/or enhance the physical properties of the medium. The substrate layer is most commonly white and opaque for graphic display applications, but could also be transparent, translucent, or colored opaque. Substrate layer 14 can comprise any polymer having desirable physical properties for the intended application. Properties of flexibility or stiffness, durability, tear resistance, conformability to non-uniform surfaces, die cuttability, weatherability, heat resistance and elasticity are examples. For example, a graphic marking film used in short term outdoor promotional displays typically can withstand outdoor conditions for a period in the range from about 3 months to about one year or more and exhibits tear resistance and durability for easy application and removal.

The material for the substrate layer is preferably a resin capable of being extruded or coextruded into a substantially two-dimensional film. Examples of suitable materials include polyester, polyolefin, polyamide, polycarbonate, polyurethane, polystyrene, acrylic, and polyvinyl chloride. Preferably, the substrate layer comprises a nonplasticized polymer to avoid difficulties with plasticizer migration and staining in the image receptor medium. Most preferably, the substrate layer comprises a polyolefin that is a propylene-ethylene copolymer containing about 6 weight % ethylene.

The substrate layer may also contain other components such as pigments, fillers, ultraviolet stabilizing agents, slip agents, antiblock agents, antistatic agents, and processing aids familiar to those skilled in the art. The substrate layer is commonly white opaque, but may also be transparent, colored opaque, or translucent.

A typical thickness of the substrate layer 14 is in the range from 12.7 to 305 microns (0.5 mil to 12 mils). However, the thickness can be outside this range providing the resulting image receptor medium is not too thick to feed into the printer or image transfer device of choice. A useful thickness is generally determined based on the requirements of the desired application.

Optional Prime Layer

Figure 2:
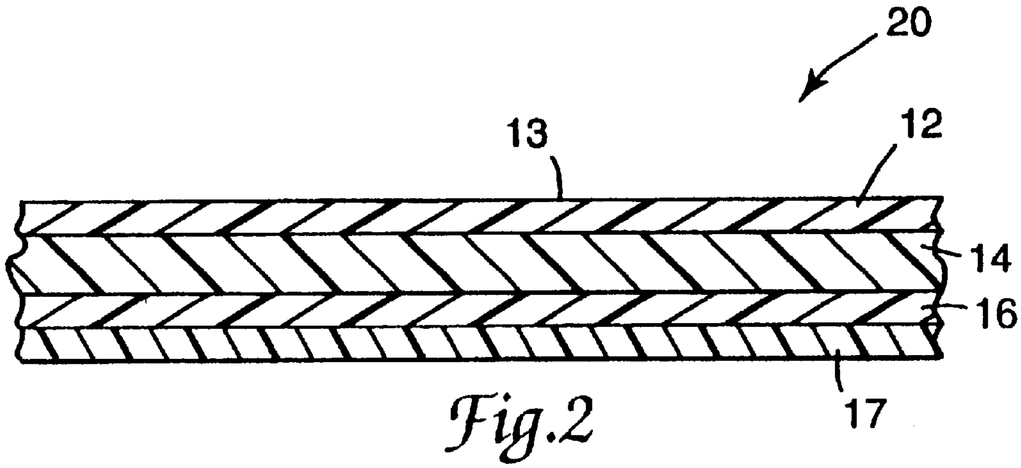
FIG. 2 is a schematic cross-sectional view illustrating the image receptor medium of this invention including the layers shown in FIG. 1 and an optional prime layer.

As illustrated in FIG. 2, optional prime layer 16 is located on the surface of substrate layer 14 opposite image reception layer 12. In the case where the image receptor medium does not include a substrate layer (not shown), the prime layer is located on the surface of the image reception layer 12 opposite the outer surface 13. The prime layer serves to increase the bond strength between the substrate layer and an adhesive layer 17 if the bond strength is not sufficiently high without the prime layer. The presence of an adhesive layer makes the image receptor medium useful as a graphic marking film. Although it is preferable to use a pressure sensitive adhesive, any adhesive that is particularly suited to the substrate layer and to the selected application can be used. Such adhesives are those known in the art and may include aggressively tacky adhesives, pressure sensitive adhesives, repositionable or positionable adhesives, hot melt adhesives, and the like.

The adhesive layer 17 is preferably covered with a release liner (not shown) that provides protection to the adhesive until the image receptor medium is ready to be applied to a surface.

Prime layer 16 may also by itself serve as an adhesive layer in some applications. The prime layer preferably comprises an ethylene vinyl acetate resin containing from about 5 weight % to about 28 weight % vinyl acetate, and a filler such as talc to provide a degree of surface roughness to the prime layer. The filler helps prevent blocking and promotes adhesion of the adhesive. The filler is generally present in an amount in the range from about 2 % to about 12 % by weight, preferably about 4 % to about 10 % by weight, and more preferably about 8 % by weight. The layer may also contain other components such as pigments, fillers, ultraviolet stabilizing agents, antiblock agents, antistatic agents, and the like.

Optional Treated Image Reception Layer

Image receptivity can be improved by the application of a surface treatment to the exposed surface of the image reception layer 12. Nonlimiting examples of surface treatment include corona treatment and flame treatment. Preferably, if surface treatment is used, corona treatment is selected. As known to those skilled in the art, corona treatment comprises passing a film between two surfaces with a sufficiently high voltage applied between them to generate a plasma which is commonly called a corona. Further details can be found in many patents and publications including: Journal of Adhesion Science and Technology, Volume 3, page 321–335, 1989, the disclosure of which is incorporated by reference herein.

Optional Inkjet Layer

Figure 3:
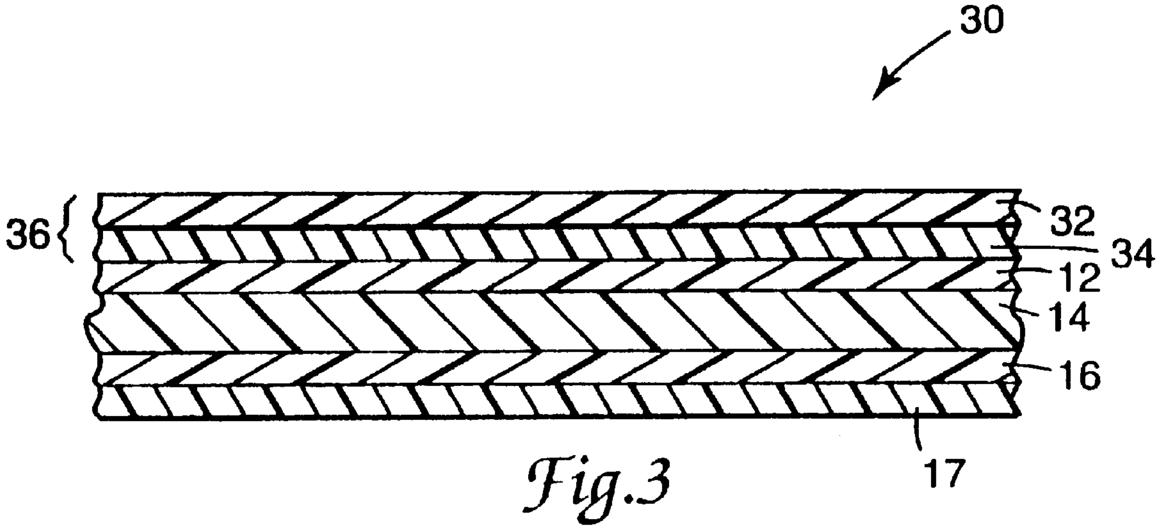
FIG. 3 is a schematic cross-sectional view illustrating the image receptor medium of this invention including the layers shown in FIG. 1, an optional prime layer and an optional inkjet layer.

FIG. 3 illustrates an image receptor medium having the same features as shown in FIG. 2, with the addition of an optional inkjet layer 36 on the outer surface 13 of the image reception layer 12. The inkjet layer is preferably used when the image receptor medium will receive images from a thermal ink jet printer using water-based inkjet inks (either dye-based or pigment-based) to provide characteristics of dye bleed resistance, low fading, uniform fading and rapid drying. In one embodiment, the inkjet layer comprises at least two layers 32 and 34. The uppermost layer 32, or top coat layer, functions as a protective penetrant layer to rapidly take up the water-based ink while the bottom coat layer 34 functions as an inkjet receptor. The bottom coat layer contains dispersed particles of a size such that the surface of the top coat layer exhibits protrusions or is roughened. The dispersed particles are preferably cornstarch or a modified cornstarch. The formulation of such inkjet layers is described in U.S. Pat. No. 5,747,148 (Warner et al.). Alternatively, the inkjet layer may comprise a single layer (not shown) such as described U.S. Pat. Nos. 5,389,723 and 5,472,789.

This invention can include other layers in addition to the image reception layer 12, the substrate layer 14, the optional prime layer 16, the optional adhesive layer 17, and the optional inkjet layer 36. Additional layers may be useful for adding color, enhancing dimensional stability, promoting adhesion between dissimilar polymers in the above-described layers, and the like. After the image receptor medium has been printed with an image, an optional protective overlaminate layer (not shown) may be adhered to the printed surface. The overlaminate layer improves weather resistance of the film by helping to protect the film from ambient humidity, direct sunlight and other weathering effects, as well as protecting the image from nicks, scratches, and splashes. In addition, the overlaminate layer can impart a desired finish to the image, such as high gloss or matte. Suitable overlaminate layers include any suitable transparent plastic sheet material bearing an adhesive on one surface. Use of such overlaminate layers is, for example, described in U.S. Pat. No. 4,966,804, incorporated by reference herein.

Making the Image Receptor Medium

The image receptor medium of this invention can be made by a number of methods. For example, layers 12 and optional layers 14 and 16 can be coextruded using any suitable type of coextrusion die and any suitable method of film making such as blown film extrusion or cast film extrusion. Adhesive layer 17 may be coextruded with the other layers, transferred to the image receptor medium from a liner, or directly coated onto the image receptor medium in an additional process step. For the best performance in coextrusion, the polymeric materials for each layer are chosen to have similar properties such as melt viscosity. Techniques of coextrusion are found in many polymer processing references, including Progelhof, R. C., and Throne, J. L., "Polymer Engineering Principles", Hanser/Gardner Publications, Inc., Cincinnati, Ohio, 1993. Alternatively, one or more of the layers may be extruded as a separate sheet and laminated together to form the image receptor medium. One or more of the layers may also be formed by coating an aqueous or solvent-based dispersion onto one or more previously extruded layers. This method is less desirable because of the extra process steps and the additional waste involved.

The finished image receptor medium may be subjected to a surface treatment method such as corona treatment to improve the image receptivity of the image receptor medium for certain applications.

Use of the Image Receptor Medium

The imaging materials that can be used in accordance with the present invention are particulate and semicrystalline or amorphous materials comprising a film-forming or resinous binder that is generally a thermoplastic. The imaging materials also contain pigments or dyes to provide contrast or color to the deposited image. Inks and toners are examples of well known imaging materials. The imaging materials may be deposited by a variety of known techniques such as electrography, screen printing, knife or roll coating, rotogravure coating, and the like.

An example of an imaging process using the image receptor medium of the present invention comprises first generating a toned image on an image transfer medium in an electrostatic printer using techniques and materials such as those described in U.S. Pat. No. 5,262,259, the disclosure of which is incorporated by reference, and then transferring the image to the image receiving surface of the image receptor medium. The image transfer can be accomplished in many ways known in the art such as passing the sheets together through heated nip rolls in a method known as hot roll lamination, or placing the sheets together on a heated platen in a vacuum drawdown frame. Hot roll lamination is described in U.S. Pat. No. 5,144,520, the disclosure of which is incorporated by reference. The imaged medium is then preferably covered with an overlaminate layer. If the multilayered film includes an adhesive layer and a release liner, the release liner may be removed and the imaged medium affixed to a wall, vehicle side, banner, or other surface using techniques well known in the art.

In another example of an imaging process, the image receptor medium is screen printed directly, thereby receiving the desired image without the extra image transfer step. The techniques and materials for practicing screen printing are described in U.S. Pat. No. 4,737,224, the disclosure of which is incorporated by reference herein. The imaged film is then used as described above. The image reception layer of the present invention is particularly suitable for screen printing because the image reception layer is extremely tolerant of the effects of UV light used to cure solventless inks used in screen printing. An example of such inks is disclosed in U.S. Pat. No. 5,462,768, which disclosure is incorporated by reference herein.

In another example of an imaging process, the image receptor medium is fed into an inkjet printer, printed directly with the desired image, and then overlaminated and applied as described above. The inkjet printer can print using either thermal inkjet inks or piezo inkjet inks. Thermal inkjet printers include those made by Hewlett Packard Corporation of Palo Alto, Calif., USA. Piezo inkjet printers include those made by Idanit Technologies, Ltd. of Rishon Le Zion 75150 Israel.

In another example of an imaging process, the image receptor medium is printed directly with an image via a thermal mass transfer process, using a device such as a GERBER EDGE thermal transfer printer (Gerber Scientific Products, Inc., Manchester, Conn., USA). The image film is then used as described above.

The invention is further illustrated by the following examples, but the particular materials and amounts thereof recited in these examples, as well as other conditions and details, should not be construed to unduly limit this invention.

Example 1

Samples of image receptor media each comprising a substrate layer and an image reception layer according to this invention were made as follows: For each of the samples with the exception of Example #13, film was produced using a cast film extrusion process. Resin pellets were fed into a 1.9 cm (¾ in) single screw extruder manufactured by C.W. Brabender Instruments Inc., South Hackensack, N.J., 07606, with a temperature profile from 204° C. (400° F.) to 232° C. (450° F.) resulting in a melt temperature of about 232° C. (450° F.). A horizontal die was used to cast the films onto a polyethylene terephthalate (PET) base film approximately 15 cm (6 in) wide and 0.05 mm (0.002 in) thick traveling at approximately 3 meters/min (10 ft/ min.). The resulting film construction was run between a steel chill roll and a rubber backup roll to solidify the molten resin into a layer having a thickness of approximately 0.1 mm (0.004 in). The samples were then run through a 20 cm (8 in) Enercon bare roll corona treater manufactured by Enercon Industries Corporation, Menomonee Falls, Wis., with a power setting of 0.35 kilowatts, and wound to form a roll. Samples containing the hindered amine light stabilizer (HALS) were made by dry blending the resin listed in the example with the HALS concentrate pellet and feeding the blended mixture to the extruder.

Example 13 was a multilayered film produced using a conventional blown film coextrusion process. Each of three extruders A, B, and C supplied a melt formulation to an annular die where the melts were combined to form a single molten stream consisting of three distinct layers in a sleeve shape. For each sample, the melt of extruder A formed the image reception layer, the melt of extruder B formed the substrate layer, and the melt of extruder C formed the prime layer. The molten polymer sleeve was then blown to its final diameter and thickness by introducing air into the sleeve and trapping it between the die and nip rolls at the top of the blown film tower. The film sleeve was then slit into two flat film webs, each of which was corona treated on the image reception layer side and wound onto a core. The resulting samples each had a thickness of about 0.06 mm 0.002.4 in), although layer thickness distribution varied. The HALS material used in all of the Examples indicated is Ampacet 10407 (Ampacet Corp.) which consists of 90% by weight of a polyethylene carrier resin and 10% by weight of Chimasorb 944, (Poly[[6-[(1,1,3,3,-tetramethyl butyl) amino]-s-triazine-2,4-diyl][[(2,2,6,6,-tetramethyl-4-piperidyl) imino] hexamethylene [(2,2,6,6,-tetramethyl-4-piperidyl) imino]]) produced by Ciba-Geigy Inc., Hawthorne, N.Y., 10532.

Layer Formulations

Image Reception Layer

| Example | Material | Name |
|---|---|---|
| 1 | EMAc<br>20% MA - block copolymer<br>(Chevron Chemical Company, Houston, TX, 77253) | EMAc 1305 |
| 2 | EMAc<br>20% MA - block copolymer<br>(Chevron Chemical Co.) | EMAc 1305 w/0.4% HALS |

-continued

| Example | Material | Name |
|---|---|---|
| 3 | EMAc<br>20% MA - random copolymer<br>(Chevron Chemical Co.) | EMAc 1205 |
| 4 | EMAc<br>20% MA - random copolymer<br>(Chevron Chemical Co.) | EMAc 1205 w/0.4% HALS |
| 5 | EMAc<br>24% MA - random copolymer<br>(Chevron Chemical Co.) | EMAc 2260 |
| 6 | EMAc<br>24% MA - random copolymer<br>(Chevron Chemical Co.) | EMAc 2260 w/0.4% HALS |
| 7 | EMAc<br>12% MA - random copolymer<br>(Chevron Chemical Co.) | EMAc 2212T |
| 8 | EMAc<br>12% MA - random copolymer<br>(Chevron Chemical Co.) | EMAc 2212T w/0.4% HALS |
| 9 | EEA<br>15% EA - random copolymer<br>(Union Carbide Corp., Danbury, CT) | EEA-DPDA-6182 |
| 10 | EEA<br>15% EA - random copolymer<br>(Union Carbide Corp.) | EEA-DPDA-6182 w/0.4% HALS |
| 11 | EEA<br>18% EA - random copolymer<br>(Union Carbide Corp.) | EEA-DPDA-6169 |
| 12 | EEA<br>18% EA - random copolymer<br>(Union Carbide Corp.) | EEA-DPDA-6169 w/0.4% HALS |
| A | Cast vinyl | 3M ScotchCal ™ 180-10 |
| B | EVA<br>12% VA resin (DuPont Polymers, Wilmington, DE) | ELVAX 3135B |
| C | EVA<br>12% VA<br>(DuPont Polymers) | ELVAX 3135B w/0.4% HALS |

Example 13

Image reception layer (15% of total thickness)

1000 parts Chevron SP1305 ethylene methyl acrylate resin (Chevron Chemical Co.

50 parts Ampacet 10407 UV inhibitor concentrate (Ampacet Corp., Tarrtyown, N.J.)

50 parts POLYFIL MT5000 talc concentrate (Polyfil Corp., Dover, N.J.)

Substrate layer (65% of total thickness)

1000 parts Fina Z9470 Polypropylene-ethylene copolymer (Fina Oil and Chemical Company, Deer Park, Tex.)

50 parts Ampacet 10407 UV inhibitor concentrate (Ampacet Corp., Tarrytown, N.J.)

Adhesive Prime layer (20% of total thickness)

1000 parts Elvax 3135B ethylene vinyl acetate resin (DuPont Polymers)

200 parts Polyfil MT 5000 talc concentrate (Polyfil Corp.)

50 parts Ampacet 10407

All of the samples were tested for ink adhesion using 3M SCOTCHCAL™ 9705 UV curing ink using a 390 mesh screen. Film samples were taped to a 30 cm×30 cm (12 in×12 in) piece of 3M Scotchcal™ 180-10 vinyl film (Minnesota Mining and Manufacturing Company of St. Paul, Minn., USA) for printing. This step was required to make the film samples easier to handle on the screenprint press. The printed samples were cured in a focus cure unit using a UV dosage of 162 millijoules per square centimeter $(mJ/c)^2)$ as measured in the UVA spectral region by a UVICURE PLUS radiometer manufactured by EIT, Inc., Sterling, Va. All of the printed samples were then evaluated using a crosshatch adhesion test as follows. Each sample was scribed with ten parallel lines spaced about 1.6 mm (1/16 in) apart using the corner of a sharp razor blade. The scribed lines cut through the ink layer only and not the base film. Another set of similar lines was scribed through the ink at right angles to the first set resulting in a crosshatch pattern. A 2.5 cm×10.2 cm (1 in×4 in) piece of 3M SCOTCH™ tape No. 610 was then applied over the crosshatch pattern and wiped with two firm application strokes using a 3M PA-1 applicator squeegee. The tape was pulled off using a sharp jerk and the crosshatched sample was observed for ink removal. The samples were rated on a scale from 0–5 with 0 being “excellent” according to visual standards and 5 being “poor”. Results are shown in the table below.

| | | | Ink adhesion 9705 UV ink cured @ 0.162 J/cm2, after # Passes Indicated. | | | | |
|---|---|---|---|---|---|---|---|
| Example | Material | Name | 0 | 5 | 10 | 15 | 20 |
| 1 | EMAc<br>20% MA - block copolymer (Chevron Chemical Co.) | EMAc 1305 | 0 | 0 | 0 | 1.5 | 4 |
| 2 | EMAc<br>20% MA - block copolymer<br>(Chevron Chemical Co.) | EMAc 1305 w/0.4% HALS | 0 | 0 | 0 | 1.5 | 2 |
| 3 | EMAc<br>20% MA - random copolymer<br>(Chevron Chemical Co.) | EMAc 1205 | 0 | 0 | 0 | 3.5 | 5 |
| 4 | EMAc<br>20% MA - random copolymer<br>(Chevron Chemical Co.) | EMAc 1205 w/0.4% HALS | 0 | 0 | 0 | 1 | 0.5 |
| 5 | EMAc<br>24% MA - random copolymer<br>(Chevron Chemical Co.) | EMAc 2260 | 0 | 0.5 | 3 | 5 | 5 |
| 6 | EMAc<br>24% MA - random copolymer<br>(Chevron Chemical Co.) | EMAc 2260 w/0.4% HALS | 0 | 0 | 0 | 0 | 5 |
| 7 | EMAc<br>12% MA - random copolymer<br>(Chevron Chemical Co.) | EMAc 2212T | 0 | 0 | 5 | 5 | 5 |
| 8 | EMAc<br>12% MA - random copolymer<br>(Chevron Chemical Co.) | EMAc 2212T w/0.4% HALS | 0 | 0 | 2 | 2 | 5 |
| 9 | EEA<br>15% EA - random copolymer<br>(Chevron Chemical Co.) | EEA-DPDA-6182 | 0 | 0 | 5 | 5 | 5 |
| 10 | EEA<br>15% EA - random copolymer<br>(Chevron Chemical Co.) | EEA-DPDA-6182 w/0.4% HALS | 0 | 0 | 2 | 2 | 5 |
| 11 | EEA<br>18% EA - random copolymer<br>(Union Carbide Corp.) | EEA-DPDA-6169 | 0 | 0 | 1 | 4.5 | 5 |
| 12 | EEA<br>18% EA - random copolymer<br>(Union Carbide Corp.) | EEA-DPDA-6169 w/0.4% HALS | 0 | 0 | 4 | 0.5 | 5 |
| 13 | EMAc | EMAc Blend | 0 | 0 | 0 | 0 | 0 |
| A | Cast vinyl | Scotchcal 180-10 | 0 | 0 | 0.5 | 5 | 5 |
| B | EVA<br>12% VA<br>(DuPont Polymers) | ELVAX 3135 B | 5 | 5 | 5 | 5 | 5 |

-continued

| Example | Material | Name | Ink adhesion 9705 UV ink cured @ 0.162 J/cm2, after # Passes Indicated. 0 | 5 | 10 | 15 | 20 |
|---|---|---|---|---|---|---|---|
| C | EVA 12% VA (DuPont Polymers) | ELVAX 3135 B w/0.4% HALS | 5 | 5 | 5 | 5 | 5 |

All of the Examples 1–13 had consistently excellent ink adhesion after 5 passes. A number of the Examples approached 20 passes. Example 13 made using a blown film process scored perfectly through 20 passes. By comparison, Comparative Examples B–C showed difficulties after 5 passes indicating that the combination of an ethylene and a more polar monomer alone do not increase adhesion of UV inks. Comparative Example A is a plasticized vinyl film that is desired to be replaced as indicated above. The odd numbered Examples, with the exception of Example #13, did not perform as well as the even numbered Examples which contained the optional but preferred HALS compound serving as a free-radical scavenger. Example 13 illustrates the performance of a formulation for a multilayered film that would be useful for a graphic film application. More specifically, Example #13 illustrates the performance of the ethylene alkyl acrylate materials and HALS in combination with diluents such as pigments and carrier resins commonly used to deliver concentrated additives for film production.

The invention is not limited to the above embodiments. The claims follow.

What is claimed is:

1. A method of providing an image on an image receptor medium, comprising screen printing the image on the image receptor medium with a UV curing screen print ink, the image receptor medium comprising a substrate layer comprising a polymer and having two opposing major surfaces; and an image reception layer on a first major surface of the substrate layer having an outer surface for image reception, said image reception layer comprising a polymer comprising at least two monoethylenically unsaturated monomeric units, wherein one monomeric unit comprises a substituted alkene where each branch comprises from 0 to about 8 carbon atoms and wherein one other monomeric unit comprises a (meth)acrylic acid ester of a nontertiary alkyl alcohol in which the alkyl group contains from 1 to about 12 carbon atoms and can include heteroatoms in the alkyl chain and in which the alcohol can be linear, branched, or cyclic in nature and an efficacious amount of a free-radical scavenger.

2. The method of claim 1, wherein said UV curing screen print ink is solventless.

3. A method of providing an image on an image receptor medium, comprising printing the image on the image receptor medium using a UV curing ink, the image receptor medium comprising a substrate layer comprising a polymer and having two opposing major surfaces;

an image reception layer on a first major surface of the substrate layer having an outer surface for image reception, said image reception layer comprising a polymer comprising at least two monoethylenically unsaturated monomeric units, wherein one monomeric unit comprises a substituted alkene where each branch comprises from 0 to about 8 carbon atoms and wherein one other monomeric unit comprises a (meth)acrylic acid ester of a nontertiary alkyl alcohol in which the alkyl group contains from 1 to about 12 carbon atoms and can include heteroatoms in the alkyl chain and in which the alcohol can be linear, branched, or cyclic in nature and an efficacious amount of a free-radical scavenger.

4. The method according to claim 3, wherein the printing step comprises at least 5 exposures of the medium to ultra-violet light without significant loss of ink adhesion properties in the medium.

5. The method according to claim 3, wherein the printing step comprises at least 10 exposures of the medium to ultra-violet light without significant loss of ink adhesion properties in the medium.

* * * * *

UNITED STATES PATENT AND TRADEMARK OFFICE

CERTIFICATE OF CORRECTION

PATENT NO. : 6,200,647 B1
DATED : March 13, 2001
INVENTOR(S) : Jeffrey O. Emslander et al.

It is certified that error appears in the above-identified patent and that said Letters Patent is hereby corrected as shown below:

Column 12,
Line 4, "$(mJ/c)^2)$" should read -- $(mJ/cm^2)$ --.

Signed and Sealed this

Fourteenth Day of May, 2002

Attest:

JAMES E. ROGAN

*Attesting Officer*

*Director of the United States Patent and Trademark Office*